(12) United States Patent
Mohr et al.

(10) Patent No.: US 11,052,832 B2
(45) Date of Patent: Jul. 6, 2021

(54) SENSOR ASSEMBLY FOR VEHICLE

(71) Applicant: AGCO International GmbH, Neuhausen (CH)

(72) Inventors: Markus Mohr, Marktoberdorf (DE); Dirk Stallmeier, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 97 days.

(21) Appl. No.: 16/654,267

(22) Filed: Oct. 16, 2019

(65) Prior Publication Data
US 2020/0114837 A1  Apr. 16, 2020

(30) Foreign Application Priority Data
Oct. 16, 2018 (GB) ..................................... 1816795

(51) Int. Cl.
| | | |
|---|---|---|
| *B60R 13/02* | (2006.01) | |
| *B60R 11/02* | (2006.01) | |
| *B60R 16/023* | (2006.01) | |
| *B62D 33/06* | (2006.01) | |
| *H04R 1/08* | (2006.01) | |

(52) U.S. Cl.
CPC .......... *B60R 11/0247* (2013.01); *B60R 13/02* (2013.01); *B60R 13/0212* (2013.01); *B60R 13/0237* (2013.01); *B60R 16/023* (2013.01); *B62D 33/06* (2013.01); *H04R 1/08* (2013.01); *B60R 2013/0287* (2013.01); *H04R 2499/13* (2013.01)

(58) Field of Classification Search
CPC . B60R 13/02; B60R 11/0243; B60R 13/0212; B60R 13/0237; B62D 33/0617; B62D 33/06; H04R 1/08

USPC ........................................ 455/569.2; 381/365
See application file for complete search history.

(56) References Cited

U.S. PATENT DOCUMENTS

| | | | | |
|---|---|---|---|---|
| 5,026,016 A | * | 6/1991 | Lisowski ................ | F16B 21/09 248/225.11 |
| 6,254,302 B1 | * | 7/2001 | Kraus .................... | F16B 5/0628 403/326 |
| 8,090,138 B2 | * | 1/2012 | Toyama .............. | B60R 11/0223 381/396 |

(Continued)

FOREIGN PATENT DOCUMENTS

| | | |
|---|---|---|
| CN | 201291814 Y | 8/2009 |
| DE | 11 2012 005811 T5 | 10/2014 |
| JP | H0698387 A | 4/1994 |

OTHER PUBLICATIONS

UK Intellectual Property Office, Search Report prepared for UK Priority Application No. 081816795.7, dated Mar. 27, 2019.

(Continued)

*Primary Examiner* — Jason S Morrow (57) ABSTRACT

A sensor assembly for mounting a microphone to an aperture of a vehicle trim panel. The microphone is in a housing with an opening permitting ambient sound to reach the microphone. A sound channel has a grid portion in the form of a first radially extending flange at a first end and an engagement portion in the form of a second radially extending flange at the other end which engages a T-slot recess on the underside of the housing. When the engagement portion engages with the T-slot recess and slides to a closed end of the recess, the sound passage is aligned with the microphone.

16 Claims, 5 Drawing Sheets

(56) References Cited

U.S. PATENT DOCUMENTS

| | | |
|---|---|---|
| 8,331,601 B2 | 12/2012 | Gratke et al. |
| 8,477,980 B2 | 7/2013 | Li et al. |
| 9,308,874 B2 | 4/2016 | Barna |
| 9,344,786 B2 * | 5/2016 | Hook .................... H04R 1/028 |
| 10,323,796 B2 * | 6/2019 | Frenal ................... F17C 13/084 |
| 2002/0149212 A1 | 10/2002 | Wild et al. |
| 2012/0213399 A1 * | 8/2012 | Li .......................... H04R 1/028 |
| | | 381/365 |
| 2015/0165983 A1 * | 6/2015 | Pan ..................... B60R 11/0247 |
| | | 381/86 |
| 2015/0210224 A1 * | 7/2015 | Barna ..................... B60R 11/02 |
| | | 381/365 |
| 2018/0281695 A1 | 10/2018 | Arasuna et al. |
| 2019/0364351 A1 * | 11/2019 | Riemann ............. B60R 11/0247 |
| 2020/0280782 A1 * | 9/2020 | Kleinheincz ........... H04R 1/086 |
| 2020/0382854 A1 * | 12/2020 | Normann ............ B60R 11/0247 |

OTHER PUBLICATIONS

UK Intellectual Property Office, Search Report for related UK Application No. GB1816795.7, dated Mar. 27, 2019.

European Patent Office, Search Report for related European Application No. EP 19 20 1265, dated Jan. 7, 2020.

\* cited by examiner

SENSOR ASSEMBLY FOR VEHICLE

FIELD OF THE INVENTION

The present invention relates to microphones or other sensors for use in vehicles and, in particular, to an assembly for the mounting of a microphone/sensor to a trim panel such as a headliner in an operator environment or cab of a vehicle.

BACKGROUND

Microphones are increasingly used for hands-free voice-controlled functions in vehicles, whether as interface to a mobile telephone connection or for voice activated control of functional features of the vehicle itself. Microphones may also be provided as part of an active noise cancellation system within the driver space of the vehicle. In all such systems, it is preferred to have multiple microphones installed within the driver space (e.g. the tractor cab of an agricultural vehicle), typically mounted to trim panels of the vehicle and connected to sound-processing and/or voice recognition systems of the vehicle, and this can lead to installation problems in the mounting and connecting up of multiple microphones. A beneficial approach to this is to have pre-formed clip/plug together microphone assemblies that may be installed simply and quickly.

U.S. Pat. No. 9,308,874 describes a microphone device for an automobile, having a microphone capsule for detecting ambient noise and a housing in which the microphone capsule is arranged. Around each of respective apertures in a trim panel, a mount is attached or constructed on the interior (i.e. hidden from a user in the driver space) of the trim panel. Into the aforementioned mount, the housing of a microphone assembly is inserted, being retained by one or more detents in a snap-fit arrangement. The microphone capsule includes an external plug connector such that wiring the microphones requires only the plugging in of connectors of a suitable wiring loom. This simplifies the assembly process, but still requires the provision of attached mounts around each aperture, which adds additional construction steps.

U.S. Pat. Nos. 8,331,601 and 8,477,980 provide further examples of microphone assemblies for attaching to the trim panel of a vehicle.

SUMMARY OF THE INVENTION

In accordance with a first aspect of the invention there is provided a sensor assembly for mounting a sensor to an aperture of a vehicle trim panel, comprising:
  a sensor;
  a housing containing the sensor and having an opening permitting external conditions to reach the sensor;
  a channel comprising a generally tubular body defining a through passage, the body having at a first end a grid portion in the form of a first radially extending flange and having at a second end an engagement portion in the form of a second radially extending flange;
  the housing having a T-slot recess on a surface thereof in the vicinity of the opening, the recess having an open end and a closed end and a width substantially identical to the diameter of the second radially extending flange of the sound channel engagement portion;
  wherein, with the channel engagement portion received within the T-slot recess and slid to the closed end thereof, the through passage is brought into alignment with the sensor.

Such an arrangement enables the quick and generally fault-free installation of such a sensor assembly, requiring only the insertion of the sound channel portion through an opening in the trim panel and the engagement with the assembly housing.

Preferably, the interior of the T-slot includes one or more detents or latching portions positioned to engage the channel engagement portion received within the T-slot recess and at the closed end thereof. This click/lock provides a positive indication to the installer that the sensor assembly has been properly installed, with the sound passage aligned with the sensor.

Suitably, to facilitate ease of assembly, a portion of the T-slot recess adjacent the open end thereof may be flared outwards.

To facilitate mounting to different thicknesses of trim panel the surface of the housing having the T-slot recess may suitably be provided with one or more spring portions, which spring portion or portions are resiliently compressible in a direction perpendicular to the surface. Preferably, such spring portions are formed as a unitary moulding with the housing. To further accommodate different thicknesses of trim panel, the first radially extending flange may be resiliently deformable towards and away from the second radially extending flange.

In order to further simplify the installation process, the housing suitably has or more electrical sockets in the exterior of the housing, which sockets are electrically connected to the sensor within the housing, and which sockets and sensor are preferably electrically and mechanically connected to a circuit board mounted within the housing.

In a preferred embodiment, the sensor is a microphone, the external conditions detected by the sensor/microphone comprise ambient sound, and the channel is a sound channel comprising the generally tubular body defining a sound passage.

To dampen spurious input to the microphone (e.g. from background mechanical noise of the vehicle), the sound channel may suitably include a funnel piece within the generally tubular body, the funnel piece having a bore extending therethrough with an internal diameter that reduces towards the second end of the body. Preferably, the sound channel and funnel piece are of different materials, for example with the sound channel being moulded plastics component and the funnel piece being a softer material such as rubber.

In a further aspect, the present invention also provides an agricultural or utility vehicle having two or more such microphone or sensor assemblies mounted to a user cab thereof. The microphone or sensor assemblies are suitably mounted within a roof of the user cab, but may also be incorporated on any suitable surface within the cab, such as a side trim panel.

BRIEF DESCRIPTION OF THE DRAWINGS

Embodiments of the present invention will now be described by way of example only, and with reference to the accompanying drawings, in which.

DETAILED DESCRIPTION OF SPECIFIC EMBODIMENTS OF THE INVENTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description. For example, although the following embodiments illustrate the mounting of sensors in the form of microphones, it will be readily appreciated that other forms of sensor may also be mounted in this manner.

Figure 1:
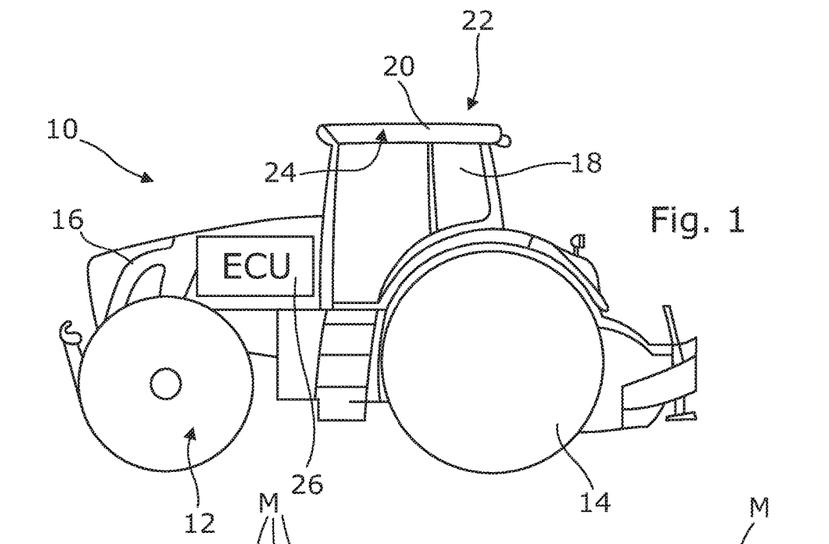
FIG. 1 schematically represents an agricultural vehicle in the form of a farm tractor having a ceiling portion trim panel to the driver space suitable to incorporate one or more microphone assemblies.

FIG. 1 shows an agricultural/utility vehicle in the form of a tractor 10 having front and rear wheels 12, 14, an engine compartment 16 and a driver's cab 18. The cab 18 has a roof section 20 comprised of an (upper) outer skin 22 and an inner trim panel 24 between which are housed various components such as cabling for electrical systems of the tractor, and one or more ducts for the heating, ventilation and air conditioning (HVAC) system of the tractor. The vehicle also includes an electronic control unit (ECU) 26 which is a programmable device operable to control features of the vehicle such as engine management and, when linked to a guidance system (not shown), automatic steering and path following systems for the vehicle. Other functionality may be included.

Figure 2:
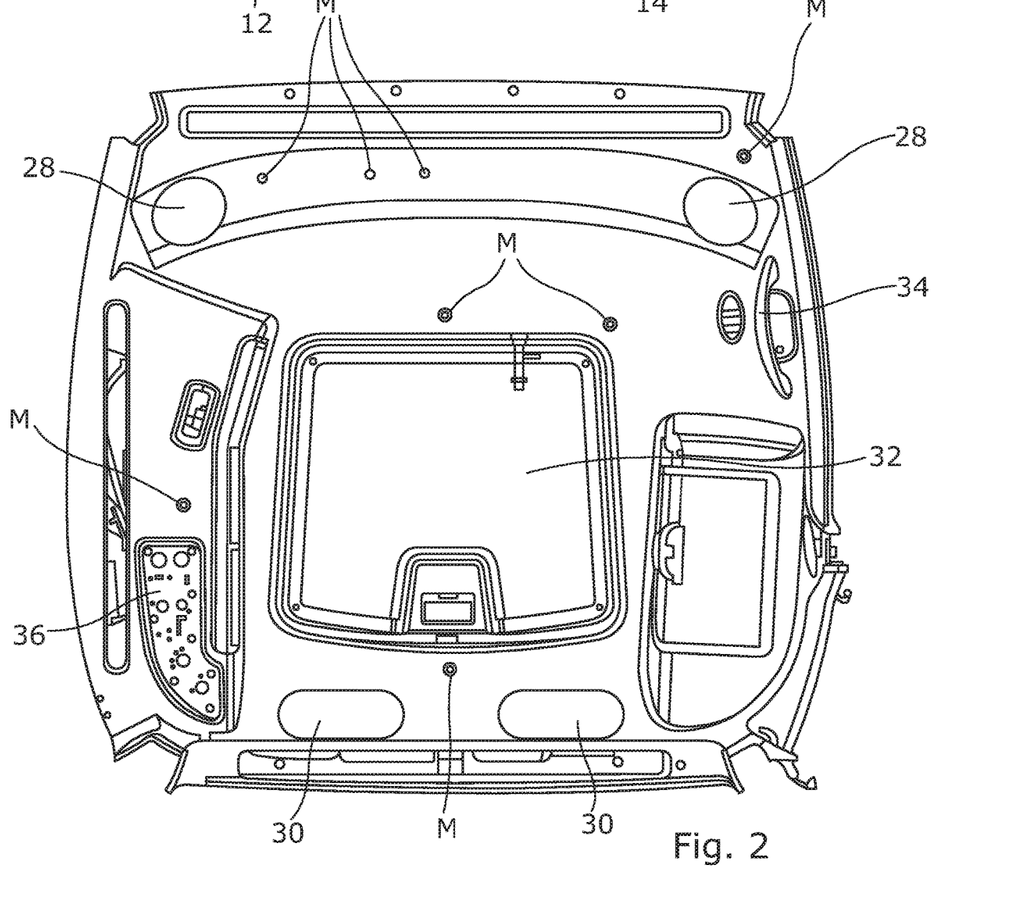
FIG. 2 shows an underside view of the ceiling portion trim panel to the driver space of the vehicle of FIG. 1, with other components installed.

FIG. 2 shows the interior (underside) of the roof section of FIG. 1. The interior of the cab roof includes such features as speakers 28 (connected to an audio system of the vehicle), output vents 30 of the HVAC system, an openable sunroof 32, a grab handle 34 over the driver's door aperture, switch controls 36 for one or more features of the vehicle (e.g. the HVAC system), and one or more microphones M coupled with the ECU. Whilst only a single microphone M may be installed, a greater number (e.g. 6 to 10 or more—depending on budget constraints) is preferred to enable filtering out of localised and/or background noise, as will be understood. Audio input to the ECU 26 from the microphones M may simply comprise detected background noise (which the ECU may be set up to counteract by active noise-cancellation systems via speakers 28), or may comprise voice commands where the ECU is set up to recognise the same and control one or more features of the vehicle in response to verbal commands of a user in the cab.

Figure 3:
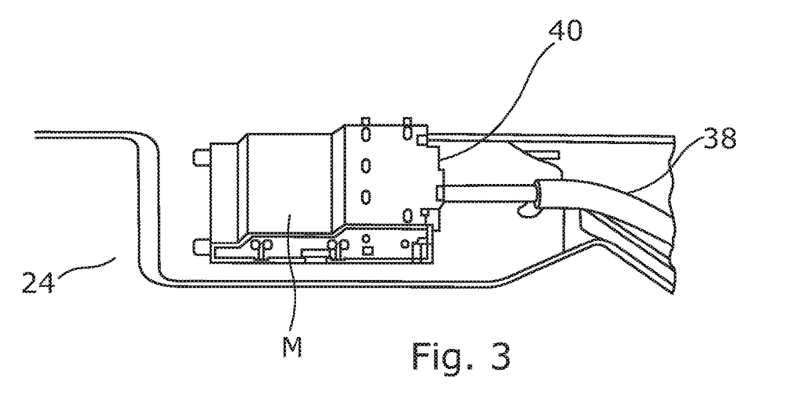
FIG. 3 shows a microphone assembly mounted to the upper side of the ceiling portion trim panel of FIG. 2.
Figure 4:
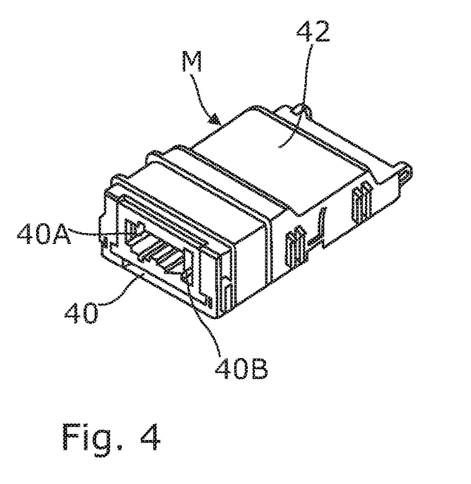
FIGS. 4 and 5 are respectively upper and lower perspective views of the microphone assembly of FIG. 3 demounted from the trim panel.
Figure 5:
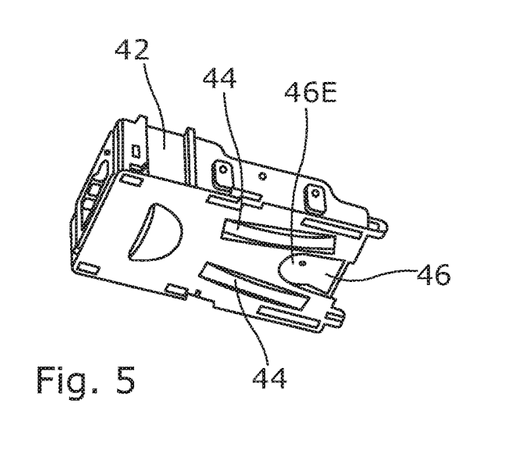

FIGS. 3 to 5 show an encapsulated microphone assembly embodying the present invention, with FIG. 3 showing one such assembly M positioned on the upper surface of the roof trim panel 24 (i.e. between the roof trim panel 24 and outer skin 22) with signal connection cables 38 from the ECU 26 connected via an appropriate plug to a socket 40 of the assembly.

FIG. 4 is a perspective view showing the encapsulated microphone assembly M disconnected. As shown, the assembly includes a housing 42 (suitably moulded of a plastic material) on the outer surface of which is mounted the socket 40 to receive the signal connection cables. The socket 40 may suitably comprise a pair of parallel connected sockets 40A, 40B such as to allow a number of microphone assemblies M to be connected in series to the ECU 26.

FIG. 5 is a further perspective view of the encapsulated microphone assembly of FIG. 4, this time from below, showing a pair of spring portions 44 and a T-slot aperture 46 (both described further below) which assist in the mounting and positioning of the microphone assembly M.

Figure 6:
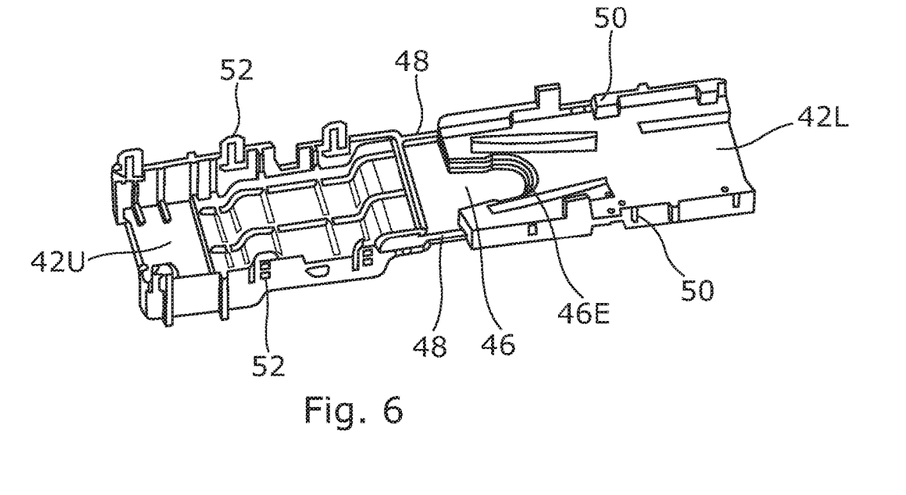
FIG. 6 shows the moulded casing of the microphone assembly of FIGS. 3 to 5 in opened-out form, without components installed.

Preferably, the housing 42 is moulded from plastic material (as mentioned above) and, as shown in FIG. 6, this may take the form of a one-piece moulding with upper 42U and lower 42L body portions joined by deformable linkages 48 allowing the two housing parts 42U, 42L to be brought together and retained in conjunction by one or more snap-fit tangs 50 (with raised projections) on one part engaging with corresponding fittings 52 (having recesses to receive the projections) on the other housing part.

Figure 7:
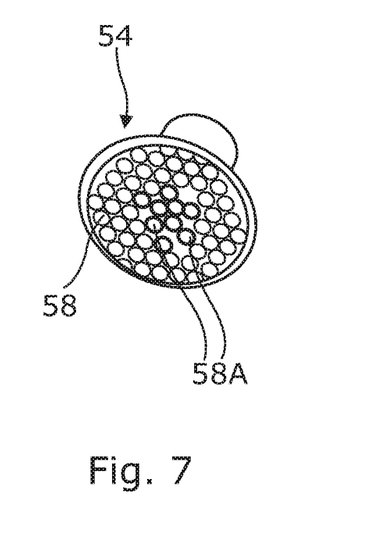
FIG. 7 shows a sound channel assembly for insertion through an aperture in the ceiling portion trim panel of FIG. 2 and engagement with the microphone assembly of FIG. 3.
Figure 8:
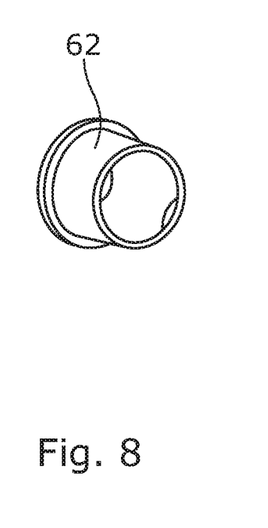
FIG. 8 shows in further detail a funnel piece of the sound channel of FIG. 7.
Figure 9:
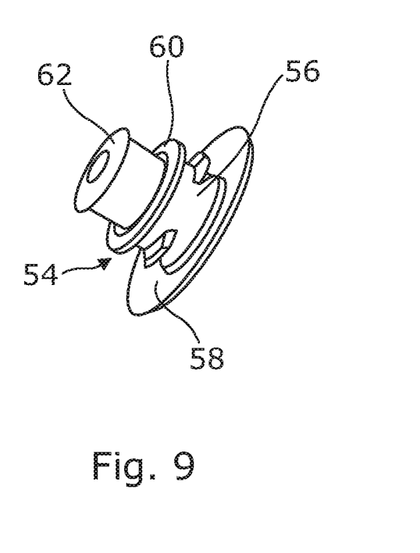
FIG. 9 illustrates the assembly of the funnel piece of FIG. 8 in the sound channel assembly of FIG. 7.

FIGS. 7 to 9 show a sound channel assembly 54 which is a click-fit into the T-channel 46 of the housing 42. The first part of the sound channel assembly is a generally tubular body 56 defining a sound passage. At one end, the tubular body 56 has a grid portion 58 in the form of a first radially extending flange with openings 58A to allow sound from the cab interior to pass into the sound channel. At the second (opposite) end of the tubular body 56 of the sound channel, there is an engagement portion in the form of a second radially extending flange 60 having a size/shape to fit with the housing T-slot 46, as described below.

In order to better direct received sound through the sound channel to a microphone within the housing 42 (described below), the sound channel preferably includes a funnel piece 62 within the generally tubular body 56 of the sound channel assembly. The outer diameter of the funnel piece 62 is suitably set to allow it to be a push fitting in the bore of the tubular body 56. Also, the funnel piece 62 has a bore with an internal diameter that reduces towards the second (rear) end of the body—that is to say it is wider at the "cab" end of the tubular body and narrows to focus sound received For acoustic reasons, the sound channel and funnel piece are preferably of different materials. For example, the sound channel may be a plastic moulding with the funnel piece being rubber.

Figure 10:
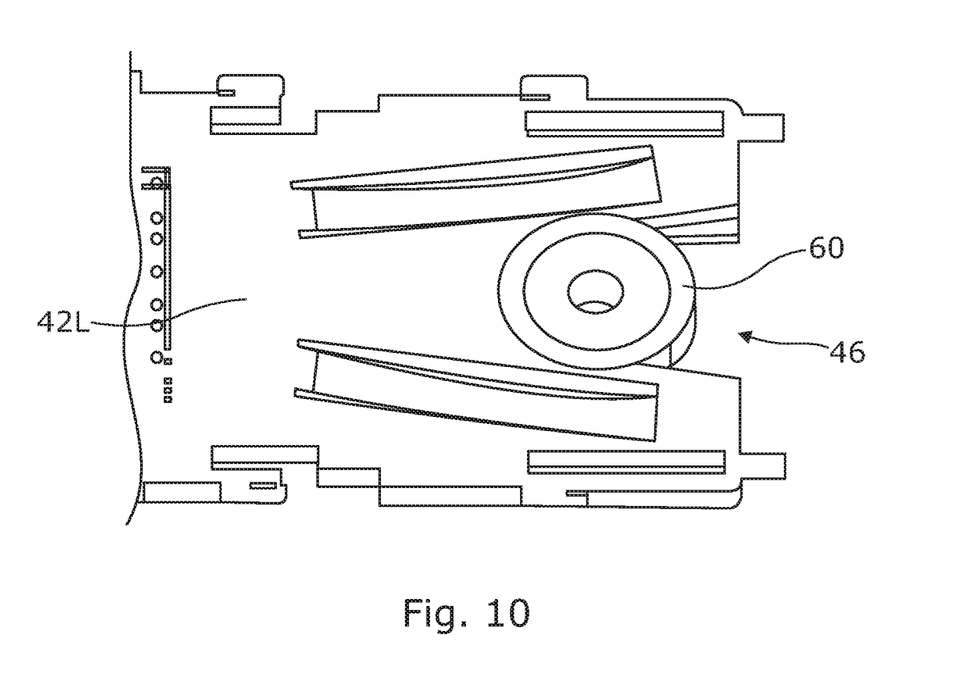
FIGS. 10 and 11 illustrate the engagement of the sound channel assembly of FIG. 7 with a T-slot opening in the microphone assembly housing of FIG. 6.
Figure 11:
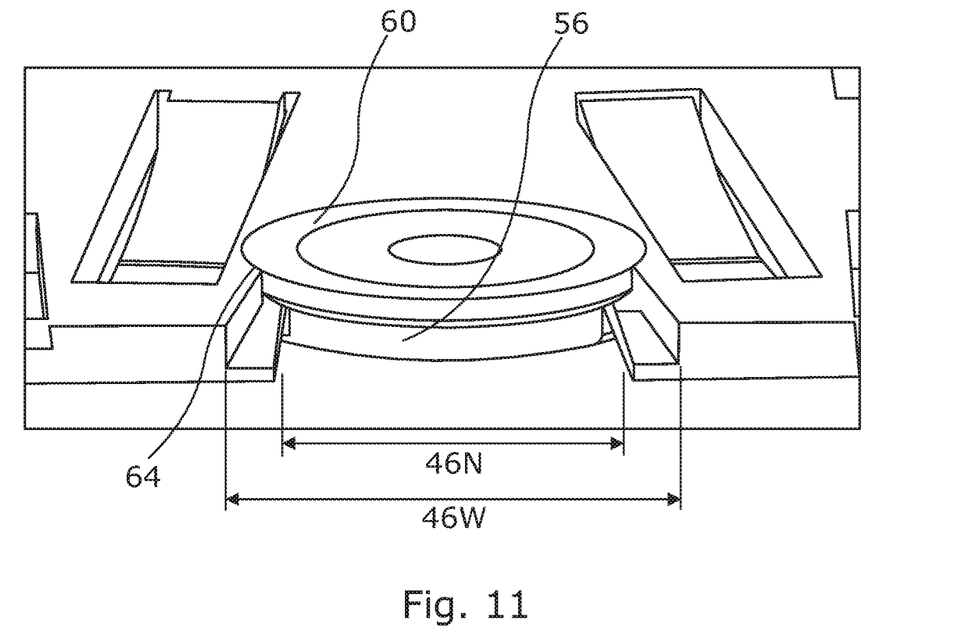

FIGS. 10 and 11 show the engagement of the sound channel assembly 54 (specifically the tubular body 56 and second radially extending flange 60) with the T-slot opening 46 in the housing 42. As will be well known, a T-slot fixing comprises a first (narrow) slot cut into a mounting surface with a second (wider) slot cut below or above (depending on surface orientation), such that the shoulders of the narrower slot provide retainers for e.g. a bolt or flanged retaining pin with a head sized to the second slot. In the present case, the narrower part 46N of the T-slot opening 46 in housing 42 is substantially the same as the outer diameter of the tubular body 56.

The T-slot opening 46 in housing 42 suitably has a blind end, such that insertion of the sound channel assembly 54 up to the blind end will result in the bore through the tubular body 56 (and tapering bore through the funnel piece 62) aligns with a microphone mounted to a circuit board contained within the housing 42. The second (wider) slot 46W of the T-slot opening 46 is suitably dimensioned to receive to second flange 60 of the tubular body 56. In order to retain the sound channel assembly 54 in place, the second slot 46W (or first slot 46N) faces may include one or more detents 64 proximal to the end of the closed slot 46, such that the sound channel assembly may be "clicked"/(locked) into position on being fully engaged up to the end of the T-slot.

To ease assembly, the first and/or second slots 46N, 46W forming the T-slot opening 46 may be flared at their open ends (i.e. at the opposite end of the slot from the blind end) as may be seen for slot 46W in FIG. 11. The closed end of the T-slot 46 may have a rounded profile (as shown at 46E in FIG. 5) corresponding to the outer profile of the tubular body 56 and/or second flange 60. Whilst preferred, it will be understood that the sound channel assembly 54 need not have a circular cross-section: where it does not, the closed end 46E may be shaped accordingly.

Figure 12:
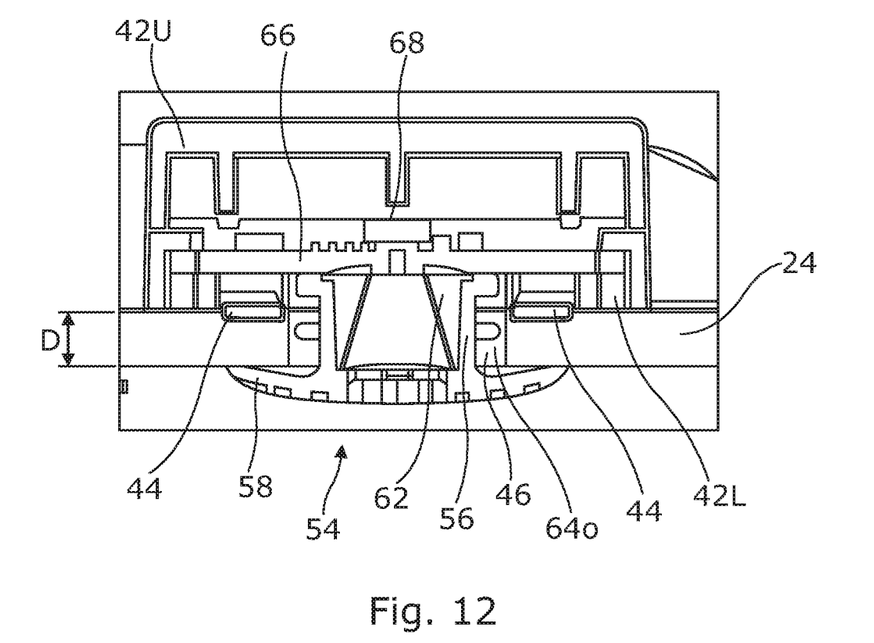
FIGS. 12 and 13 are front and side sectional views of the microphone assembly and sound channel assembled through an aperture in the ceiling portion trim panel.
Figure 13:
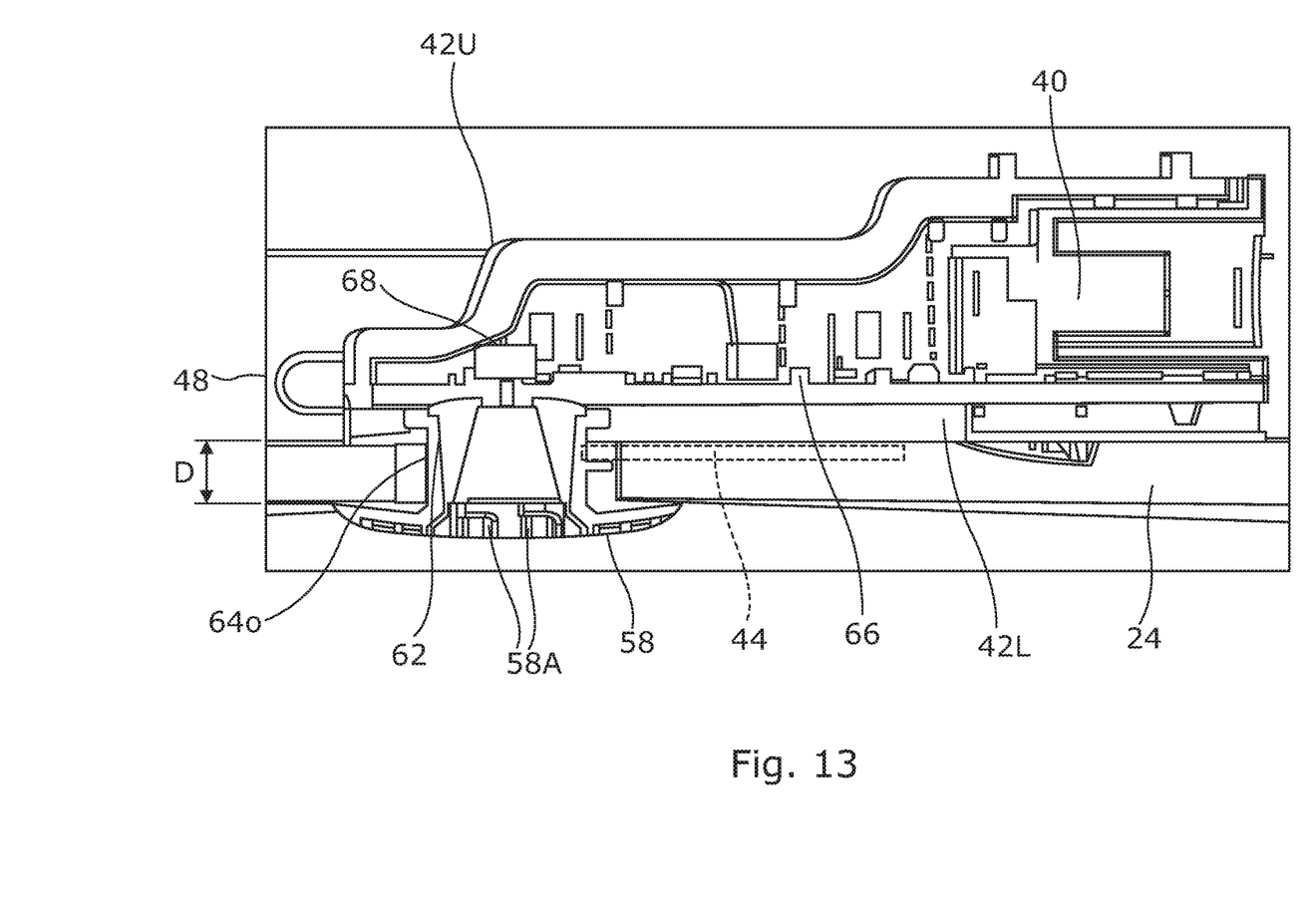

FIGS. 12 and 13 show side sectional views (from mutually orthogonal directions) through the microphone assembly M attached through an opening 64o in the trim panel 24 forming the lining of the cab roof 20. The casing 42 includes a circuit board 66 to which a microphone 68 and the or each electrical connector 40A, 40B is attached, and by means of which the microphone and connectors are electrically connected. The interior of the casing 42 and circuit board 66 are configured such that, when the sound channel assembly 54 is fully engaged at the closed end 46E within the T-slot 46 in the casing, the bore through the tubular body 56 (and tapering bore through the funnel piece 62 aligns with the microphone 68.

With the first flange 58 of the sound channel extending beyond the boundaries of the opening 64o in the trim panel 24 on a first (within the cab) side of the trim panel, and the housing 42 extending beyond those boundaries on a second side of the trim panel (i.e. between panel 24 and the roof outer skin 22), the microphone assembly M is held in place against the trim panel 24 when the second flange 60 is engaged with the T-slot 46. The resiliently-deformable spring portions 44 on the underside of the housing casing 42 are designed to be under compression when the second flange 60 is engaged with the T-slot 46, thereby assisting in holding the microphone assembly M firmly in position. With a reasonably broad range of deformability (e.g. 1-5 mm or more) of the spring portions 44, varying thicknesses D of trim panel 24 may be accommodated. Preferably, the first flange 58 of the sound channel also has a degree of flexibility to accommodate such variations in thickness.

It will be appreciated that an arrangement as described above simplifies the assembly process. It just requires the sound channel assembly 54 to be pushed through the aperture 64o in the trim panel 24, the second flange 60 to be moved (preferably clipped by detent 64) into position at the closed end 46E of the T-slot in the housing 42, and the electrical connections to be plugged into connectors 40A, 40B.

In the foregoing the applicants have described a sensor assembly M for mounting a sensor, and in particular a microphone, to an aperture 64o of a vehicle trim panel 24 (which may comprise a roof lining or one or more side panels within the cab of a vehicle). The assembly comprises a microphone 68 and a housing 42 containing the microphone 68 and having an opening permitting ambient sound to reach the microphone 68. A sound channel 54 has at a first end a grid portion in the form of a first radially extending flange 58 and at the other an engagement portion 60 in the form of a second radially extending flange which engages a T-slot recess 46 on the underside of the housing 42. When the sound channel engagement 60 portion is received within the T-slot recess 46 and slid to the closed end 46E thereof, the sound passage is brought into alignment with the microphone 68.

From reading of the present disclosure, other modifications will be apparent to those skilled in the art and the scope of the invention is limited only by the following claims.

The invention claimed is:

1. A sensor assembly for mounting a sensor to an aperture of a vehicle trim panel, comprising:
 a sensor contained in a housing, the housing comprising:
  an opening through which external conditions reach the sensor; and
  a T-slot recess on a surface of the housing proximate the opening and comprising an open end and a closed end;
 a channel comprising:
  a tubular body defining a through passage and having a first end and a second end;
  a grid portion formed by a first radially extending flange at the first end of the body; and
  an engagement portion formed by a second radially extending flange at the second end of the body;
 wherein, the T-slot recess has a width substantially similar to the diameter of the second radially extending flange and when the engagement portion is at the closed end of the T-slot recess the through passage is in alignment with the sensor.

2. The sensor assembly of claim 1, wherein an interior surface of the T-slot comprises one or more detents or latching portions, positioned to engage with the engagement portion at the closed end of the T-slot recess.

3. The sensor assembly of claim 1, wherein a portion of the T-slot recess adjacent the open end is flared outwards.

4. The sensor assembly of claim 1, wherein the surface of the housing with the T-slot recess comprises one or more spring portions, resiliently compressible in a direction perpendicular to the surface.

5. The sensor assembly of claim 4, wherein each of the one or more spring portions are formed as a unitary moulding with the housing.

6. The sensor assembly of claim 1, wherein the first radially extending flange is resiliently deformable towards and away from the second radially extending flange.

7. The sensor assembly of claim 1, wherein the housing further comprises one or more electrical sockets exterior of the housing, which sockets are electrically connected to the sensor within the housing.

8. The sensor assembly of claim 7, wherein the one or more electrical sockets and the sensor are electrically and mechanically connected to a circuit board mounted within the housing.

9. The sensor assembly of claim 1, wherein the channel further comprises a funnel piece within the body, the funnel piece having an internal diameter that reduces towards the second end of the body and comprises a bore extending therethrough.

10. The sensor assembly of claim 9, wherein the channel is comprised of one or more different materials from the funnel piece.

11. The sensor assembly of claim 10, wherein the funnel piece is comprised of rubber.

12. The sensor assembly of claim 1, wherein the sensor is a microphone, the external conditions ambient sound, and the body defining a sound passage.

13. The sensor assembly of claim 1, assembled to the vehicle trim panel having an aperture therethrough, wherein the channel extends through the aperture, the grid portion extends beyond the aperture across a first surface of the panel, and the T-slot recess is engaged with the engagement portion on a second opposing surface of the panel.

14. A vehicle having two or more of the sensor assemblies of claim 1, mounted to a cab of the vehicle.

15. The vehicle of claim 14, having the two or more sensor assemblies mounted within a roof of the cab.

16. The vehicle of claim 14, having the two or more sensor assemblies mounted within one or more side trim panels of the cab.

\* \* \* \* \*